United States Patent
Sato et al.

(10) Patent No.: US 6,626,568 B2
(45) Date of Patent: Sep. 30, 2003

(54) RADIATION CLINICAL THERMOMETER AND METHOD OF MEASURING BODY TEMPERATURE USING THE RADIATION CLINICAL THERMOMETER

(75) Inventors: Tetsuya Sato, Kyoto (JP); Hiroyuki Ota, Kyoto (JP)

(73) Assignee: Omxon Corporation, Kyoto (JP)

( * ) Notice: Subject to any disclaimer, the term of this patent is extended or adjusted under 35 U.S.C. 154(b) by 0 days.

(21) Appl. No.: 09/875,931

(22) Filed: Jun. 8, 2001

(65) Prior Publication Data

US 2001/0053171 A1 Dec. 20, 2001

(30) Foreign Application Priority Data

Jun. 9, 2000 (JP) ........................................ 2000-174531

(51) Int. Cl.[7] .............................. G01J 5/02; A61B 5/00
(52) U.S. Cl. ...................................... 374/121; 600/474
(58) Field of Search ................................ 374/121, 120; 600/549, 474

(56) References Cited

U.S. PATENT DOCUMENTS

| 5,340,215 | A | * | 8/1994 | Makita et al. | ............... 374/158 |
| 5,487,607 | A | * | 1/1996 | Makita et al. | ............... 374/158 |
| 5,522,662 | A | * | 6/1996 | Shiokawa | ................... 374/130 |
| 5,626,147 | A | * | 5/1997 | Lackey | ........................ 128/736 |
| 6,047,205 | A | * | 4/2000 | Pompei | ........................ 600/474 |
| 6,149,297 | A | * | 11/2000 | Beerwerth et al. | .......... 374/121 |
| 6,192,268 | B1 | * | 2/2001 | Yamamoto et al. | ......... 600/474 |
| 6,358,216 | B1 | * | 3/2002 | Kraus et al. | ................. 600/549 |
| 2001/0021218 | A1 | * | 9/2001 | Fukura et al. | ............... 374/208 |

FOREIGN PATENT DOCUMENTS

| EP | 0618431 A1 | * | 10/1994 | ................. 374/158 |
| JP | 62082332 A | * | 4/1987 | ................. 374/121 |
| JP | 02028524 A | * | 1/1990 | ................. 374/121 |
| JP | 06197870 A | * | 7/1994 | ................. 600/323 |
| JP | 08 215154 | | 8/1996 | |
| WO | WO-99/25240 A1 | * | 5/1999 | ............ A61B/5/00 |

* cited by examiner

Primary Examiner—Diego Gutierrez
Assistant Examiner—Mirellys Jagan
(74) Attorney, Agent, or Firm—Morrison & Foerster LLP

(57) ABSTRACT

There is provided a radiation clinical thermometer which does not require experience and can measure an accurate body temperature easily and quickly since the user recognizes that a probe is correctly directed toward an eardrum. When a measured temperature is in a predetermined range, it is determined that the probe is inserted in an ear, and a level 1 is displayed. When a first maximum value of temperature measurement values appears, a level 2 is displayed. When a second maximum value of temperature measurement values appears, a level 3 is displayed to notify the user of the optimum insertion state for body temperature measurement.

9 Claims, 11 Drawing Sheets

RADIATION CLINICAL THERMOMETER AND METHOD OF MEASURING BODY TEMPERATURE USING THE RADIATION CLINICAL THERMOMETER

BACKGROUND OF THE INVENTION

1. Field of the Invention

The present invention relates to a radiation clinical thermometer for measuring a body temperature by measuring an amount of infrared light radiated from a living body, and a method of measuring the temperature.

2. Description of the Related Art

Conventionally, as this type of radiation clinical thermometer, there is an aural clinical thermometer for determining a body temperature by measuring an amount of infrared light radiated from an eardrum.

In such an aural clinical thermometer, in order to measure an accurate body temperature, it is necessary that a probe is inserted in an ear and a detecting surface of an infrared sensor is correctly directed toward an eardrum, that is, a probe is correctly directed toward the eardrum.

Thus, as is disclosed in Japanese Patent Application Laid-open No. Hei. 7-286905, there is a clinical thermometer in which an illuminating device is provided so that a position of an eardrum can be confirmed before measurement. Further, as is disclosed in Japanese Patent Application Laid-open No. Hei. 7-47057, there is a clinical thermometer in which a finder is provided so that it is possible to confirm whether a probe is inserted at a position where an eardrum can be seen. Further, as is disclosed in Japanese Patent Application Laid-open No. Hei. 6-142062, there is a clinical thermometer in which a field of view of an infrared sensor can be confirmed by using a movable mirror. Further, as is disclosed in Japanese Patent Application Laid-open No. Hei. 9-5167, there is a clinical thermometer in which a visible light lamp and a reflecting mirror are provided so that an eardrum can be seen by the eyes.

Any of these clinical thermometers are designed such that a person other than a user can confirm a position of an eardrum, and any of these are not realized, and even if they are realized, they become very expensive so that they are difficult to adopt.

That is, there is no means for enabling a user himself to confirm whether or not a probe is correctly inserted toward an eardrum.

In a conventional aural clinical thermometer, a measurement value of a body temperature is obtained by a procedure as shown in FIG. 12. That is, a power source is turned on (step 101), and after a probe of a clinical thermometer is inserted in an ear (step 102), a measurement switch is pressed (step 103), so that there occurs a transition to a measurement operation of carrying out A/D conversion or the like of a sensor signal (step 104), a body temperature is calculated by using the A/D conversion value (step 105), and the body temperature is displayed (step 106). At this time, as a measurement method, there is generally adopted a system in which sampling is carried out plural times to perform A/D conversion at step 104 and an average value of the plurality of A/D conversion values is used at step 105, or a peak hold system (see Japanese Patent Application Laid-open No. Hei. 8-215154) in which a body temperature is determined by using a peak value among the plurality of A/D conversion values. In the peak hold system like this, since the peak value of measurement temperature is used to calculate the body temperature, there is a high probability that a temperature when a probe is directed toward an eardrum is obtained. Also, by FIG. 13 showing a temperature distribution with respect to an eardrum and an external auditory meatus, it is indicated that the temperature of the eardrum is highest in an ear, and the temperature of the eardrum can be measured at a high probability by obtaining the peak value (FIG. 13 shows actually measured data of eight testees, which are normalized while the temperature of the eardrum is made 37° C. Here, "Mean" indicates an average value, and "SD" indicates a standard deviation). Like this, even in the conventional method, it is possible to get the temperature of the eardrum more accurately by measurement and calculation.

However, in the foregoing conventional technique, although there is a high probability that a temperature when a probe is correctly directed toward an eardrum can be measured by the measurement method, since the user can not know when the probe is correctly directed toward the eardrum, in order to recognize a correct insertion position of the probe, an experience of making measurement plural times is necessary, and there is a problem that when measurement can be made only one time as in the case where the body temperatures of unspecified many patients are measured in a hospital, it is hard to obtain a correct measurement value.

SUMMARY OF THE INVENTION

The present invention has been made to solve the problem of the conventional technique, and an object thereof is to provide a radiation clinical thermometer in which an accurate body temperature can be easily and quickly measured without requiring any experience since a user recognizes that a probe is correctly directed toward an eardrum.

In order to achieve the above object, according to the present invention, a radiation clinical thermometer comprises temperature measurement means for measuring a temperature of a measurement object on the basis of an amount of infrared light radiated from the measurement object, a probe to be inserted in an ear of a user, insertion state determination means for determining an insertion state of the probe, and notification means for notifying the user of the insertion state of the probe.

With the above construction, since the user can recognize the insertion state of the probe, experience is not needed to correctly direct the probe toward the eardrum, and an accurate body temperature can be easily and quickly measured.

The insertion state determination means may determine the insertion state of the probe by a variation pattern of measured temperature.

Further, the insertion state determination means may determine whether or not the probe is inserted in the ear.

Further, the temperature measurement means may start a body temperature measurement processing on the basis of the determined insertion state of the probe.

Further, the insertion state determination means may have a function to determine whether or not the insertion state of the probe is an insertion state suitable for body temperature measurement, and a period of time for which a determination is performed may be prolonged in accordance with a determination result of the insertion state in a predetermined time.

Further, in the case where the period of time for which the determination is performed is prolonged, a determination criterion of the insertion state of the probe may be changed.

Further, the notification means may have a function to notify the insertion state of the probe stepwise.

Further, display means for displaying a measurement result may be provided, and after completion of a body temperature measurement processing, the insertion state of the probe at the time of the measurement, together with a measurement value, may be displayed on the display means.

Further, the temperature measurement means may have a function to correct a measurement value on the basis of the insertion state of the probe at the time of measurement.

Further, according to the present invention, a method of measuring a body temperature using a radiation clinical thermometer in which a probe is inserted in an ear and a temperature of a measurement object is measured on the basis of an amount of infrared light radiated from the measurement object, comprises a step of measuring the temperature of the measurement object toward which the inserted probe is directed, a step of judging whether or not a measured temperature value is within a predetermined temperature range, and a step in which in a case where the measured value is within the predetermined temperature range, it is determined that the probe has been inserted in the ear and this is notified to the user.

Further, according to the present invention, a method of measuring a body temperature using a radiation clinical thermometer in which a probe is inserted in an ear and a temperature of a measurement object is measured on the basis of an amount of infrared light radiated from the measurement object, comprises a step of measuring the temperature of the measurement object toward which the inserted probe is directed, a step of recognizing a variation pattern of measured temperature values, a step of relating a predetermined variation pattern of the measured temperature values to an insertion state of the probe, and a step of notifying a user of the related insertion state of the probe.

Further, the variation pattern of the temperature measurement values related to the insertion state of the probe may be a pattern in which a relative or local maximum value appears in the temperature measurement values.

Further, the insertion state of the probe suitable for body temperature measurement may be related to a variation pattern in which two relative or local maximum values consecutively appear in the temperature measurement values from a predetermined point of time.

DETAILED DESCRIPTION OF THE PREFERRED EMBODIMENTS

Hereinafter, embodiments of the present invention will be described with reference to the drawings.

Figure 1B:
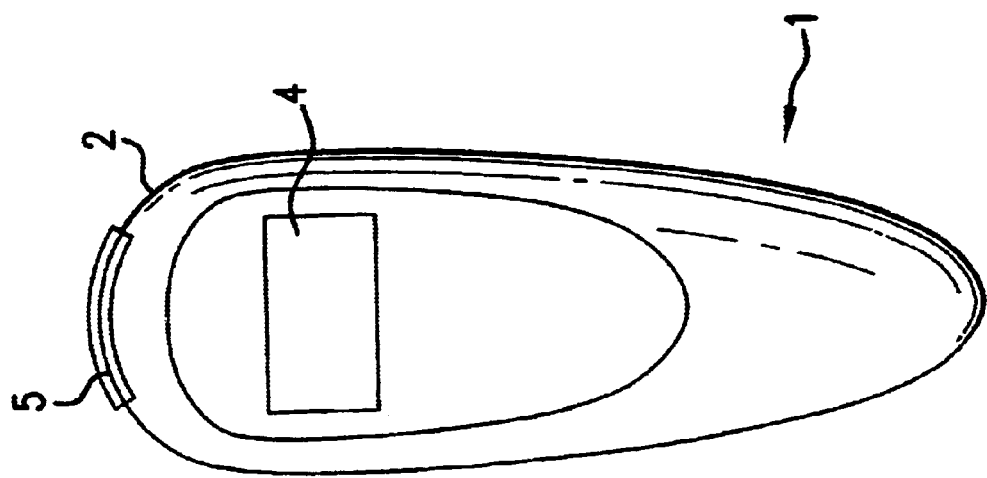
FIGS. 1A and 1B are views showing an outer appearance of an aural clinical thermometer according to an embodiment.
Figure 1A:
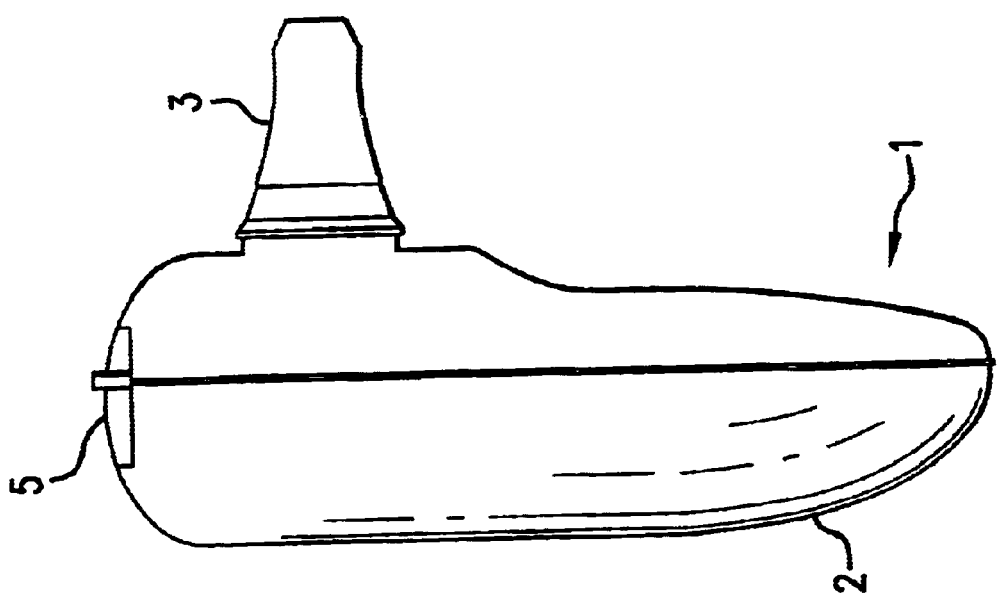

FIGS. 1A and 1B are views showing the whole structure of an aural clinical thermometer according to an embodiment.

A clinical thermometer 1 includes a flat columnar main body portion 2, a probe 3 protruding orthogonally to the main body portion 2, and a display portion (LCD) 4 formed on a flat surface of the main body portion 2 at a side opposite to the probe 3. A measurement start switch 5 is provided at an upper end portion of the main body portion 2. The user grasps the main body portion 2, inserts the probe 3 in an ear, and presses the measurement start switch 5, so that the measurement of body temperature is carried out.

Figure 2:
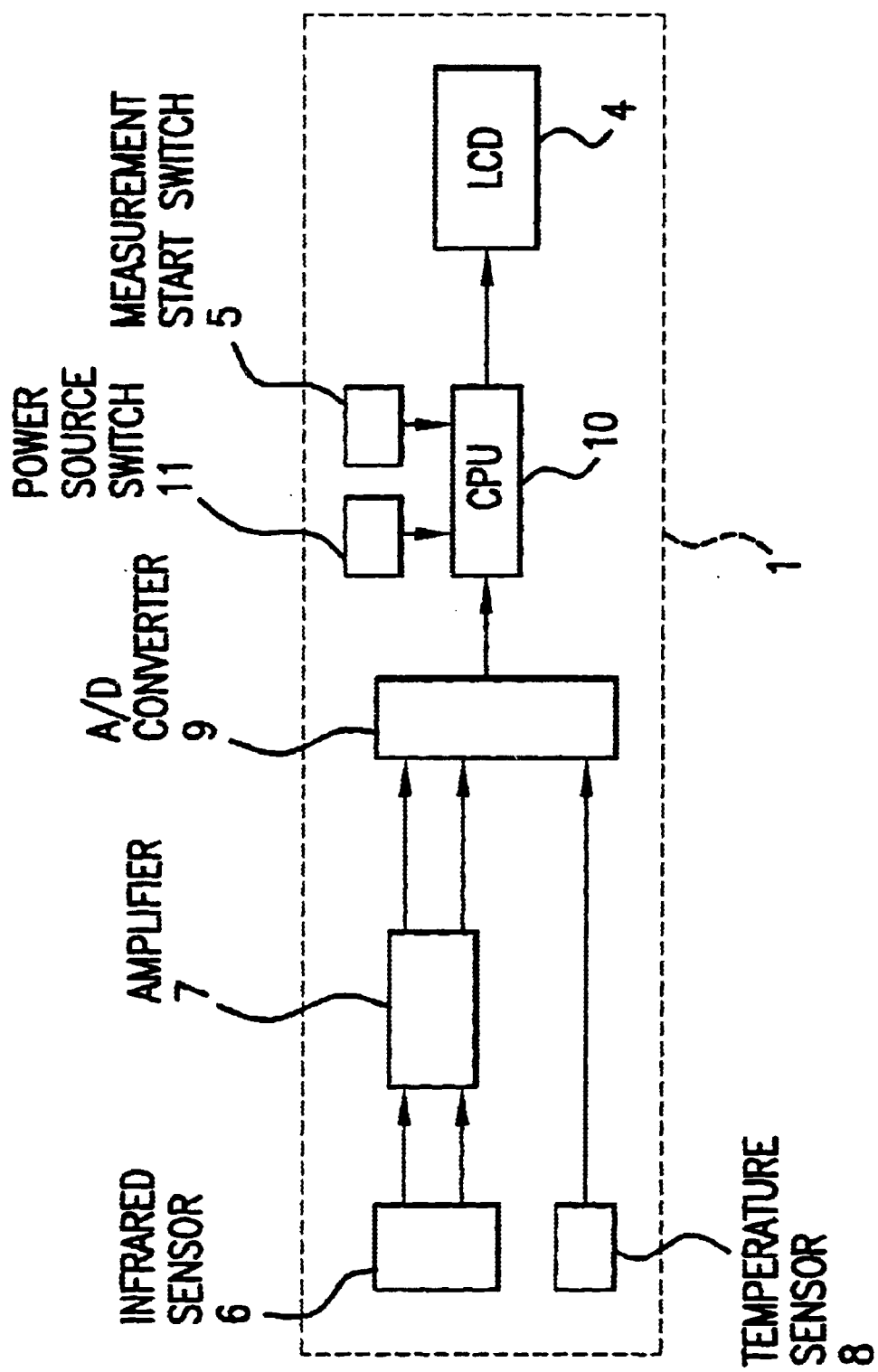
FIG. 2 is a block diagram showing an inner structure of a clinical thermometer.

FIG. 2 is a block diagram showing a rough inner structure of the clinical thermometer.

The clinical thermometer 1 mainly includes an infrared sensor 6 for detecting infrared light radiated from an eardrum, an amplifier 7 for amplifying an output signal from the infrared sensor 6, a temperature sensor 8 for detecting the temperature of the infrared sensor 6, an A/D converter 9 for converting analog signals outputted from the amplifier 7 and the temperature sensor 8 into digital signals, a CPU 10 for carrying out a predetermined arithmetic and logical operation for the digital signals outputted from the A/D converter 9 to calculate a body temperature or the like, a display portion 4 for displaying information such as a measurement value of the body temperature obtained by the arithmetic and logical operation in the CPU 10, a power source switch 11 for making or stopping power supply to the whole device, and a measurement start switch 5 for issuing an instruction to start body temperature measurement (in this embodiment, the power source switch 11 and the measurement start switch 5 are constituted by the same power source/measurement start switch 5). Here, temperature measurement means is constituted by the infrared sensor 6, the amplifier 7, the temperature sensor 8, the A/D converter 9, and the CPU 10. Further, the CPU 10 constitutes insertion state determination means, and the display portion 4 constitutes notification means and display means.

Figure 3:
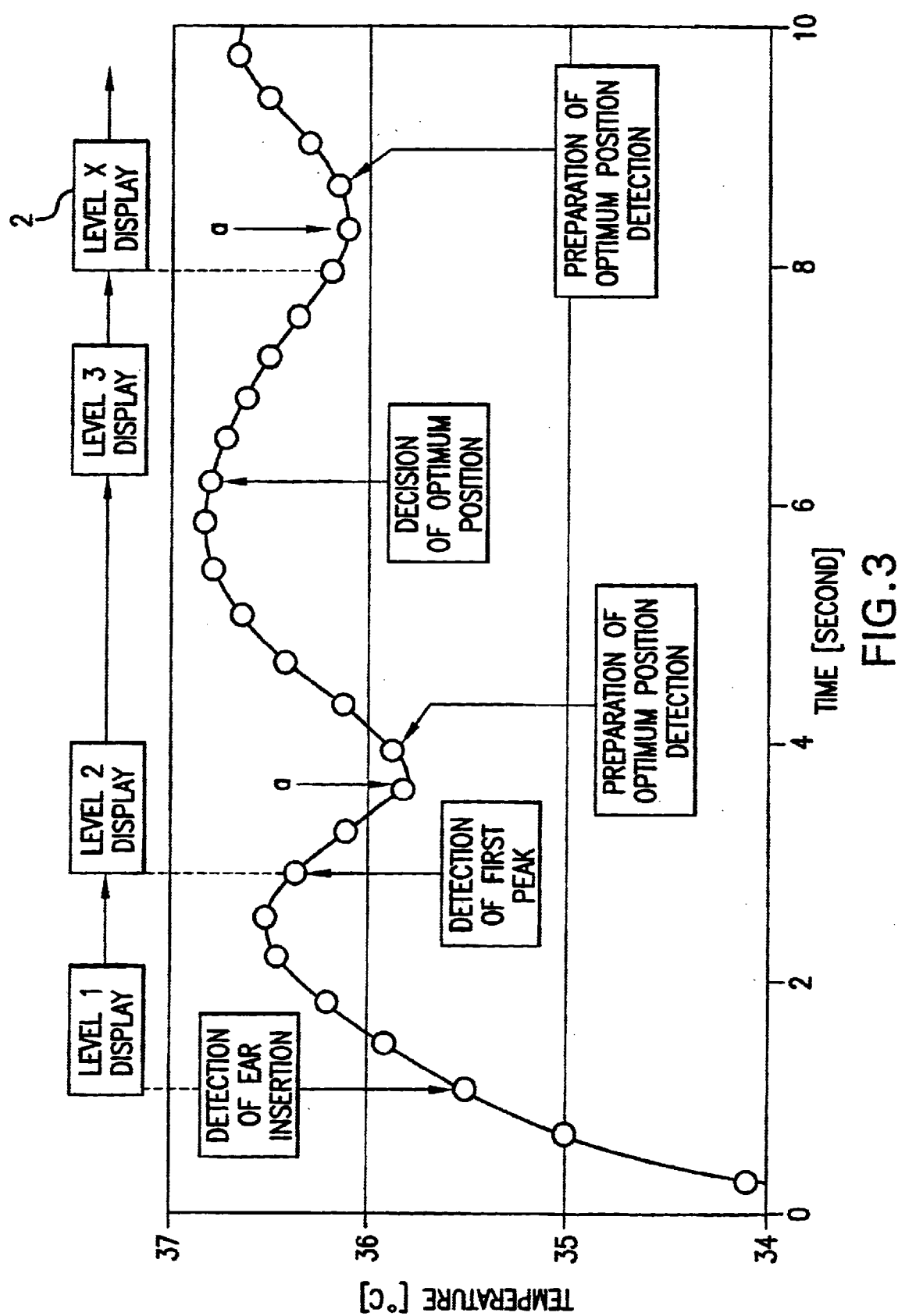
FIG. 3 is a graph showing both a variation of sampling data of a clinical thermometer and a display of a display portion.
Figure 4A:
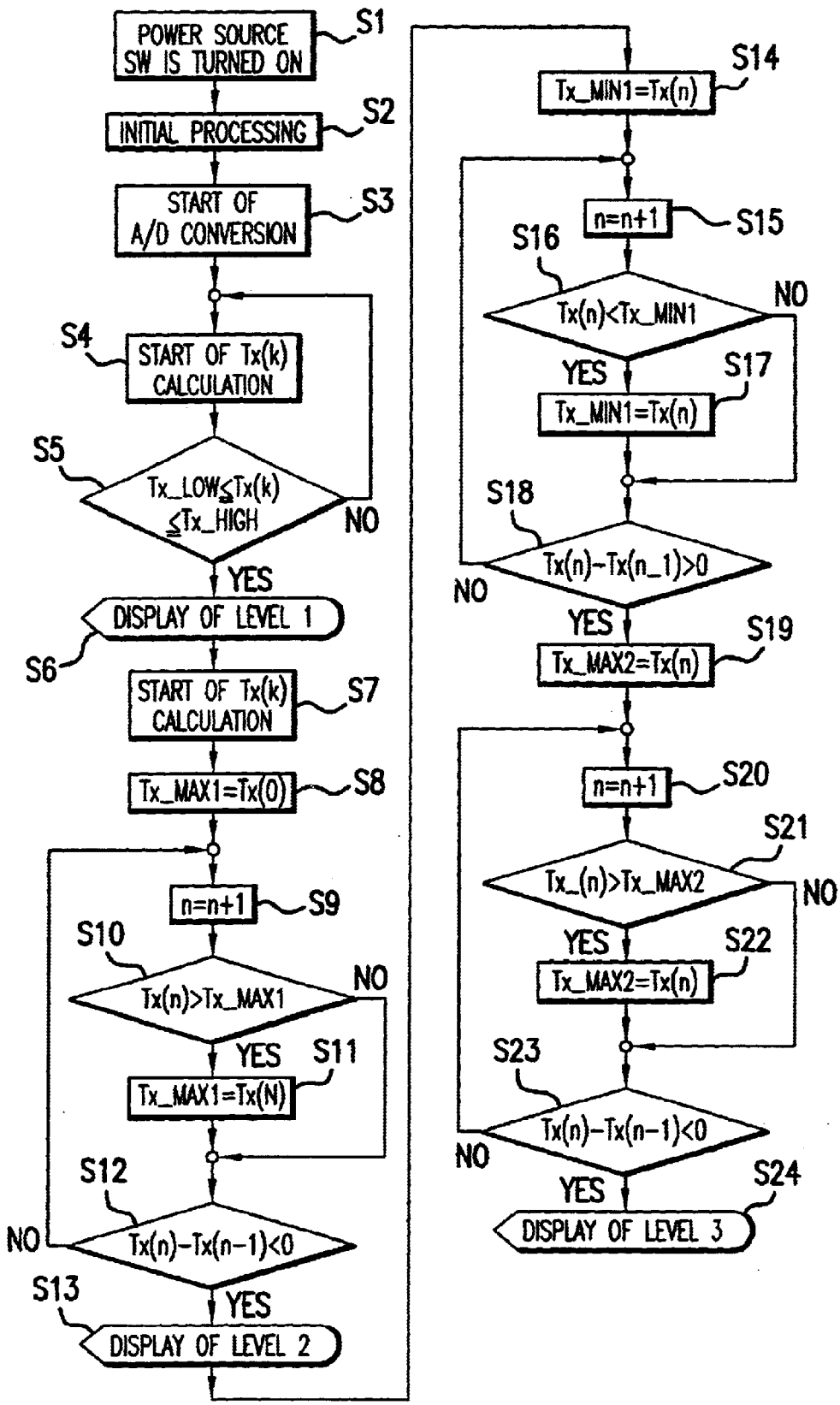
FIGS. 4A and 4B are flowcharts showing a processing procedure at the time of measuring a body temperature using a clinical thermometer.
Figure 4B:
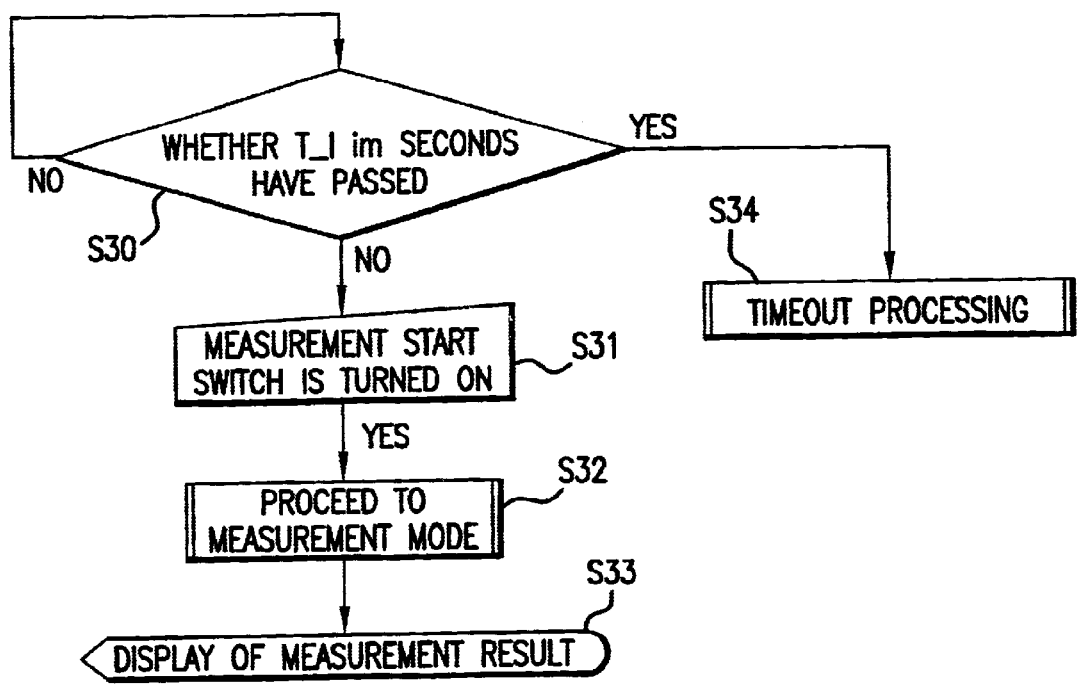
Figure 5:
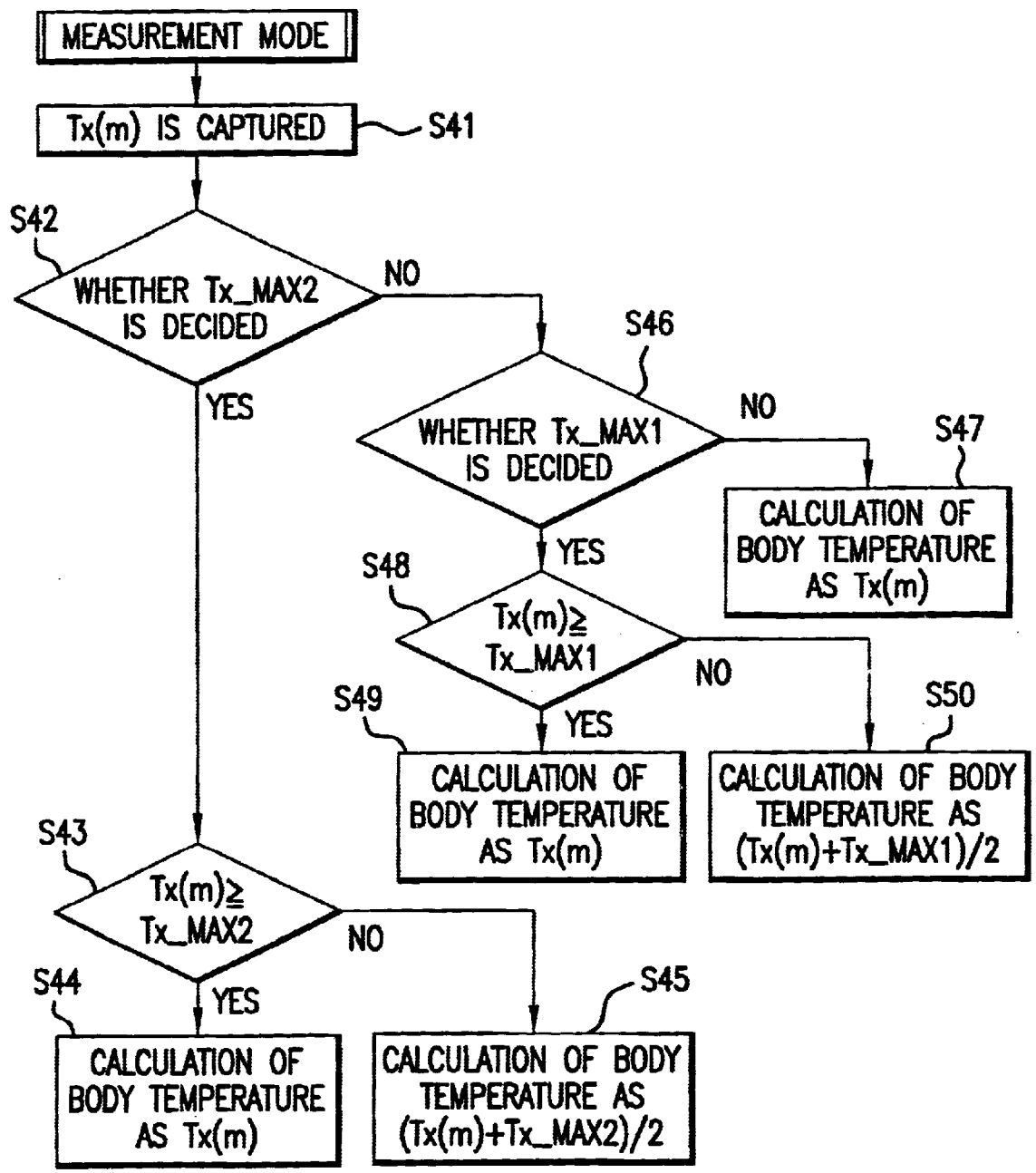
FIG. 5 is a flowchart showing a processing procedure at the time of measuring a body temperature using a clinical thermometer.

FIG. 3 is a graph showing a variation of sampling data of the clinical thermometer 1 associated with a display of the display portion 4. FIGS. 4A and 4B and 5 are flowcharts showing the outline of a processing procedure at the time of body temperature measurement. FIGS. 6A to 6L are views showing transitions of a display of the display portion 4.

Figure 6:
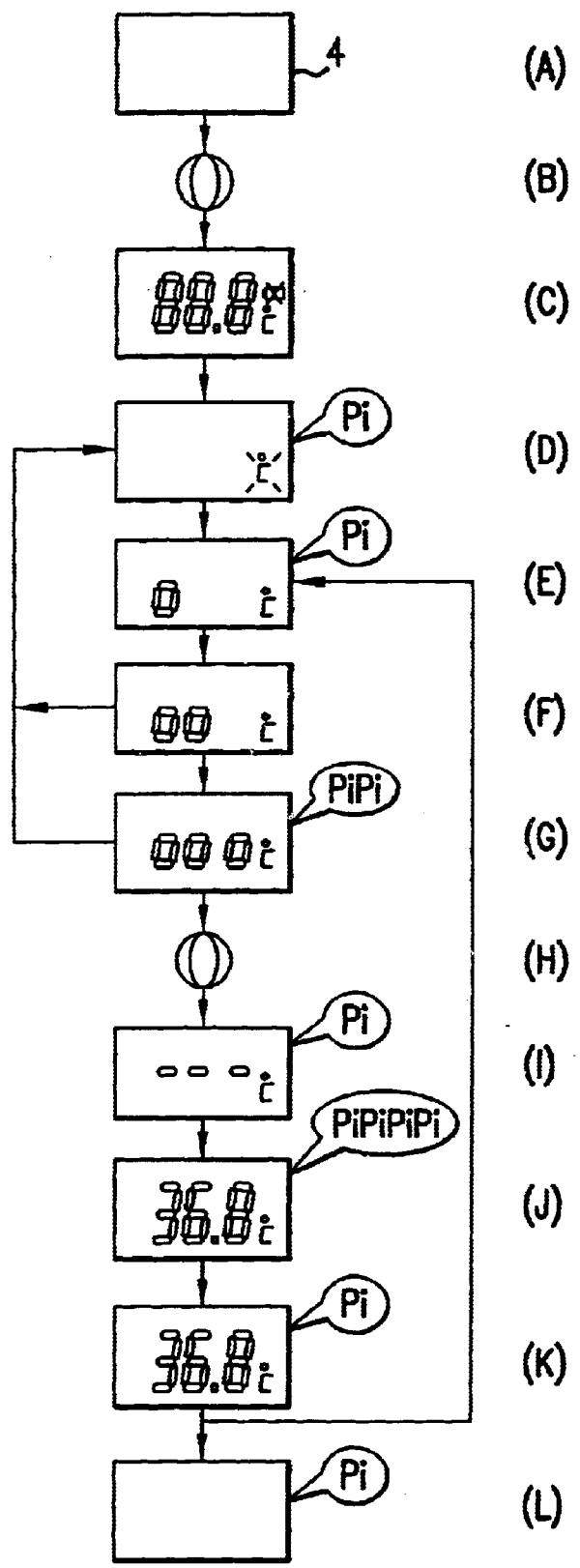
FIGS. 6A to 6L are views showing transitions of a display of a display portion at the time of measuring a body temperature using a clinical thermometer.

First, the power source is turned on by pressing the power source/measurement start switch 5 (step 1). When the power source is turned on, an initial processing such as initialization of data and a check of the LCD of the display portion 4 is carried out (step 2). FIG. 6A shows a display during a power source off state, and FIG. 6B schematically shows a power source/measurement start switch operation. FIG. 6C shows a display at the time of the initial processing, in which segments of the display portion 4 are displayed in a whole lighting state, and the initial processing of data of the CPU or the like is executed, together with confirmation of existence of a blank in the display on the display portion 4.

When the initial processing is ended, as shown in FIG. 6D, there is an electric sound of "Pi", and a "° C." display goes on and off to notify the user of the completion of measurement preparations. The user inserts the probe 3 in an ear at this stage. In the clinical thermometer 1, the output of the infrared sensor 6 having passed the amplifier 7 and the output of the temperature sensor 8 are inputted to the A/D converter 9 and are converted into digital signals (step 3).

The digital signals obtained in the A/D converter 9 are sent to the CPU 10, and calculation of a temperature $T_x(k)$ is started (step 4). It is determined whether or not the calculated $T_x(k)$ satisfies $T_x\_low \leq T_x(k) \leq T_x\_high$ (step 5). Although $T_x\_low$ and $T_x\_high$ can be suitably set, as an example, they can be set to 34° C. and 42° C., respectively. If the determination result at step 5 is YES, it is determined that the probe has been inserted in the ear, and there is an electric sound of "Pi", and a display of level 1 as shown in FIG. 6E is made on the display portion 4 (step 6). If the determination result at step 5 is NO, the procedure returns to step 4.

Next, calculation of $T_x(n)$ is started (step 7). First, $T_x\_max1=T_x(0)$, or $T_x(0)$ is set in $T_x\_max1$ (step 8). Next, n=n+1, or the value of n is incremented by 1 (step 9). Here, it is determined whether or not $T_x(n)>T_x\_max1$ is satisfied (step 10). If the determination result at step 10 is NO, the procedure proceeds to step 12 described later. If the determination result at step 10 is YES, $T_x\_max1=T_x(n)$, or $T_x(n)$ is set in $T_x\_max1$ (step 11). Here, it is determined whether or not $T_x(n)-T_x(n-1)<0$ is satisfied (step 12). If the determination result at step 12 is NO, the procedure returns to step 9. If the determination result at step 12 is YES, a display of level 2 as shown in FIG. 6F is made on the display portion 4 (step 13).

The processing at steps 7 to 13 will be specifically explained below. That is, after the probe 3 is inserted, while the user moves the probe 3 in the ear, when the probe 3 passes through a position where an angle of the probe 3 with respect to the eardrum is nearly optimum, as shown in FIG. 3, the first relative or local maximum value $T_x\_max1$ is detected from a variation curve of $T_x$. At this time, the display of the level 2 is made on the display portion 4 in order to notify the user that the probe is close to the position where the angle of the probe with respect to the eardrum is optimum.

Next, $T_x\_min1=T_x(n)$, or $T_x(n)$ is set in $T_x\_min1$ (step 14). Next, n=n+1, or the value of n is incremented by 1 (step 15). Here, it is determined whether or not $T_x(n)<T_x\_min1$ is satisfied (step 16). If the determination result at step 16 is NO, the procedure proceeds to step 18 described later. If the determination result at step 16 is YES, $T_x\_min1=T_x(n)$ (step 17). Here, it is determined whether or not $T_x(n)-T_x(n-1)>0$ is satisfied (step 18). If the determination result at step 18 is NO, the procedure returns to step 15. If the determination result at step 18 is YES, $T_x\_max2=T_x(n)$, or $T_x(n)$ is set in $T_x\_max2$ (step 19). Next, n=n+1, or the value of n is incremented by 1 (step 20). Here, it is determined whether or not $T_x(n)<T_x\_max2$ is satisfied (step 21). If the determination result at step 21 is NO, the procedure proceeds to step 23 described later. If the determination result at step 21 is YES, $T_x\_max2=T_x\_max1$ (step 22). Here, it is determined whether or not $T_x(n)-T_x(n-1)<0$ is satisfied (step 23). If the determination result at step 23 is NO, the procedure returns to step 20. If the determination result at step 23 is YES, there is an electric sound of "PiPi", and a display of level 3 as shown in FIG. 6G is made on the display portion 4.

Here, the processing at steps 14 to 24 will be specifically explained below. That is, after the display of the level 2, when the probe 3 is further moved, it passes through a point farthest from the eardrum, that is, a point where $T_x$ is lowest (point designated by a1 in FIG. 3). Thereafter, when $T_x$ starts to rise, it is determined that the probe approaches the position where the angle with respect to the eardrum becomes optimum, and detection of the optimum insertion position of the probe 3 is prepared. Then, when the second relative maximum value $T_x\_max2$ is detected, it is determined that the probe position at this point of time is optimum, and the level 3 is displayed on the display portion 4 to urge the user to proceed to the measurement operation. Like this, since the user is notified that the position of the probe is optimum for body temperature measurement, even if the user is not experienced, the body temperature can be accurately measured. Further, it is not necessary for the user to direct the probe randomly in various directions to make measurement, the measurement can be quickly made.

When the user presses the power source/measurement start switch at the point of time when the level 3 is displayed (see FIG. 6H), there is an electric sound of "Pi" and the procedure proceeds to the measurement operation. During the measurement operation, a display as shown in FIG. 6I is made on the display portion 4. After about one second, there is an electric sound of "PiPiPi", and as shown in FIG. 6J, the measured body temperature is displayed on the display portion 4, and the measurement is ended. When the probe 3 is drawn out from the ear, as shown in FIG. 6K, a "° C." display goes on and off to notify the user that the measurement preparations have been again completed. When it is left for one minute in the state where the measurement preparations have been again completed, there is an electric sound of "Pi" and the display on the display portion 4 disappears as shown in FIG. 6L.

In the case where the measurement start switch 5 is not pressed and the movement of the probe 3 is continued after the level 3 is displayed, the foregoing relative maximum value calculation processing is continued. When temperature becomes lower than the newest relative maximum value temperature by a predetermined value $\Delta T_x$ (for example, 0.5° C.) during the relative maximum value calculation processing after the display of the level 3, the display is made to return to the level 2.

In the foregoing flowchart, an interruption can be always made by using the measurement start switch at any point of time after the display of the level 1 at step 5, and the processing shown in FIG. 4B is carried out.

That is, it is determined whether or not T_lim seconds have passed from the display of the level 1 (insertion of the probe in the ear) (step 30). If the determination result at step 30 is NO, it is determined whether or not the measurement start switch is turned on (step 31). If the determination result at step 31 is NO, the procedure returns to step 30. If the determination result at step 31 is YES, a measurement mode processing described later is executed (step 32), and a measurement result is displayed on the display portion 4 (step 33). If the determination result at step 30 is YES, a timeout processing is carried out (step 34).

Here, the processing procedure in the measurement mode will be described with reference to FIG. 5.

When the procedure proceeds to the measurement mode, first, $T_x(m)$ is captured (step 41).

Next, it is determined whether or not $T_{x\_}max2$ has been decided (step 42). If the determination result at step 42 is YES, it is determined whether or not $T_x(m) \geq T_{x\_}max2$ is satisfied (step 43). If the determination result at step 43 is YES, $T_x(m)$ is calculated as the body temperature (step 44). If the determination result at step 43 is NO, $(T_x(m)+T_{x\_}max2)/2$ is calculated as the body temperature (step 45).

On the other hand, if the determination result at step 42 is NO, it is determined whether or not $T_{x\_}max1$ has been decided (step 46). If the determination result at step 46 is NO, $T_x(m)$ is calculated as the body temperature (step 47). If the determination result at step 46 is YES, it is determined whether or not $T_x(m) \geq T_{x\_}max1$ is satisfied (step 48). If the determination result at step 48 is YES, $T_x(m)$ is calculated as the body temperature (step 49). If the determination result at step 48 is NO, $(T_x(m)+T_{x\_}max1)/2$ is calculated as the body temperature (step 50).

In the processing at the foregoing measurement mode, in the case where it is detected that the insertion position of the probe 3 at the time of measurement is different from the optimum position, if the temperature obtained at the time of the measurement is lower than the temperature detected at the optimum position, an average value of the both is displayed as the measurement result. Conversely, if the temperature obtained at the time of the measurement is higher than the temperature detected at the optimum position, the temperature obtained at the time of the measurement is displayed as the measurement result.

In the foregoing embodiment, although the measurement operation is carried out by the user's pressing of the power source/measurement start switch, the procedure may automatically proceed to the measurement operation after the display of the level 3.

Further, in the foregoing embodiment, although the state where the second relative maximum value of temperature measurement values appears after the determination that the probe has been inserted in the ear, is related to the optimum probe position, in order to determine the optimum position of the probe, a determination may be made on another relationship of the optimum position of the probe and a variation pattern of temperature measurement values.

Figure 7:
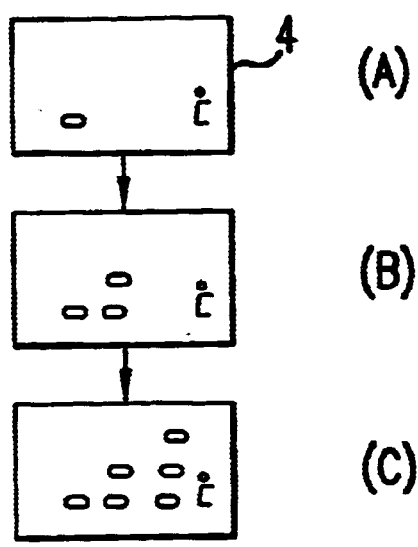
FIGS. 7A to 7C are views showing another display example of a display portion.
Figure 8:
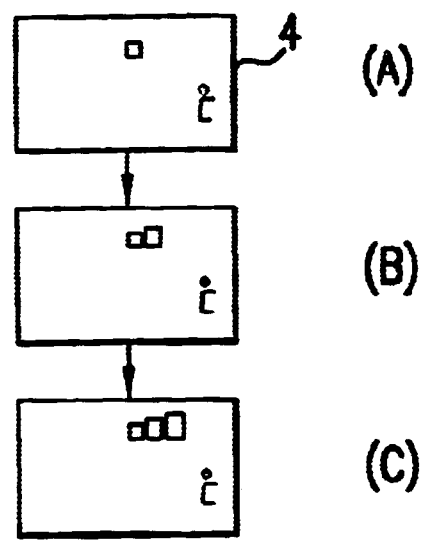
FIGS. 8A to 8C are views showing another display example of a display portion.
Figure 9:
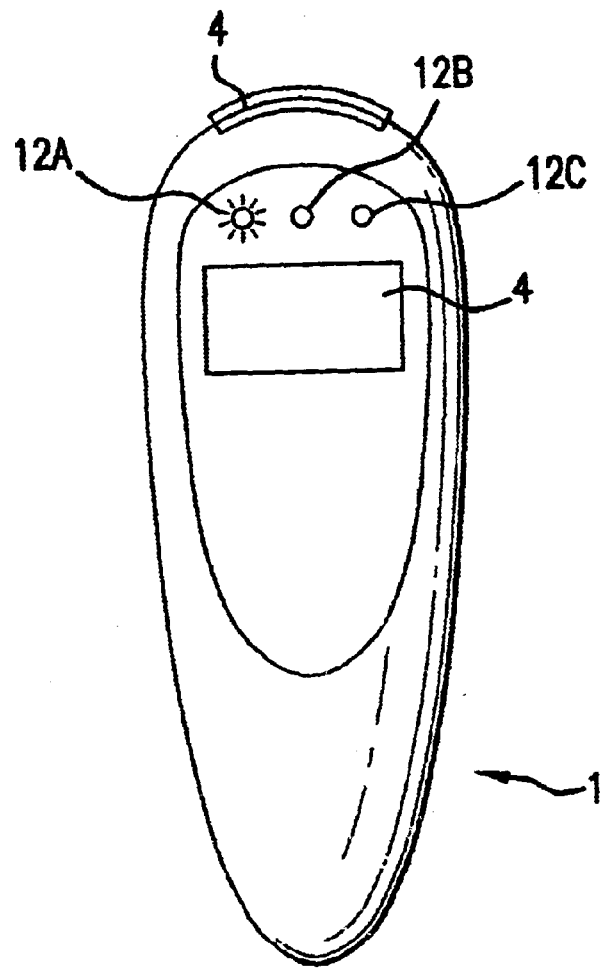
FIG. 9 is a view showing another embodiment of a level display.
Figure 10:
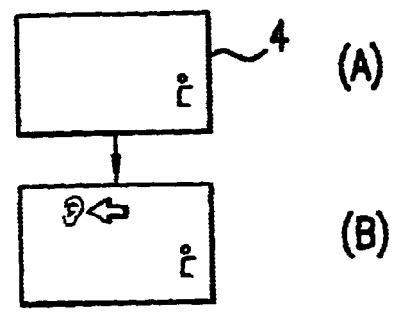
FIGS. 10A and 10B are views showing another example of a display portion.

In the display example of the display portion 4 shown in FIGS. 6A to 6L, although the level is displayed by the number of square by using the segments for body temperature display, similarly, as shown in FIGS. 7A, 7B and 7C, the level may be displayed by the number of horizontal bars by using the segments for body temperature display. Further, as shown in FIGS. 8A, 8B and 8C, a display region used exclusively for the display of the level may be provided in which bars having heights increasing stepwise are displayed in parallel. As shown in FIG. 9, three LEDs 12a, 12b and 12c may be provided at the upper portion of the display portion 4, and the number of lighting LEDs may be made to successively increase in accordance with the level. Further, as shown in FIGS. 10A and 10B, after the probe is inserted in the ear, the stepwise display may not be carried out, but an electric sound of "Pi" may be made and a mark of an ear may be displayed in the state where the probe corresponding to the level 3 is positioned.

Figure 11A:
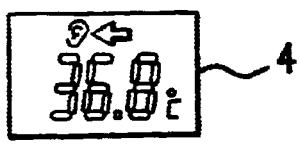
FIGS. 11A and 11B are views showing other display examples at the time of displaying a body temperature.
Figure 11B:
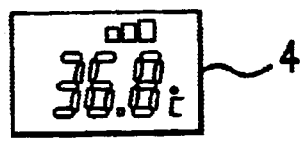
Figure 12:
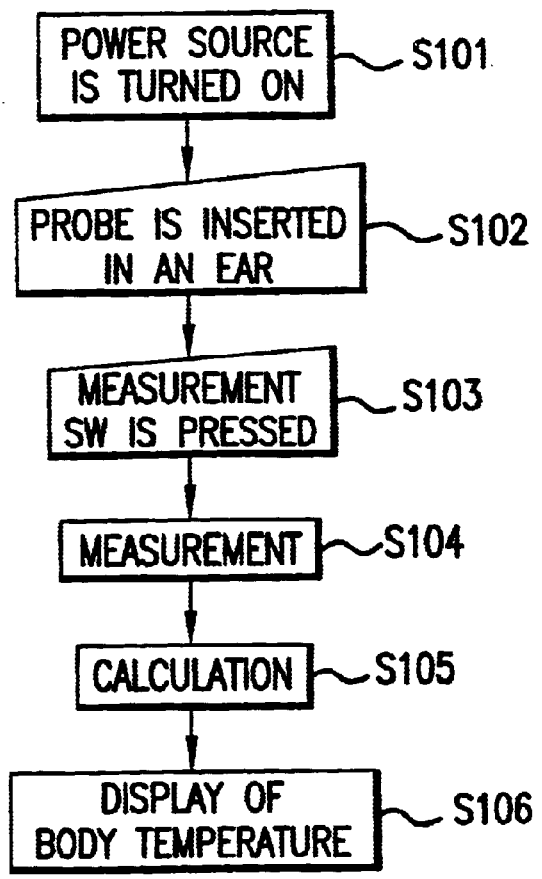
FIG. 12 is a flowchart showing a measurement procedure of a conventional aural clinical thermometer.
Figure 13:
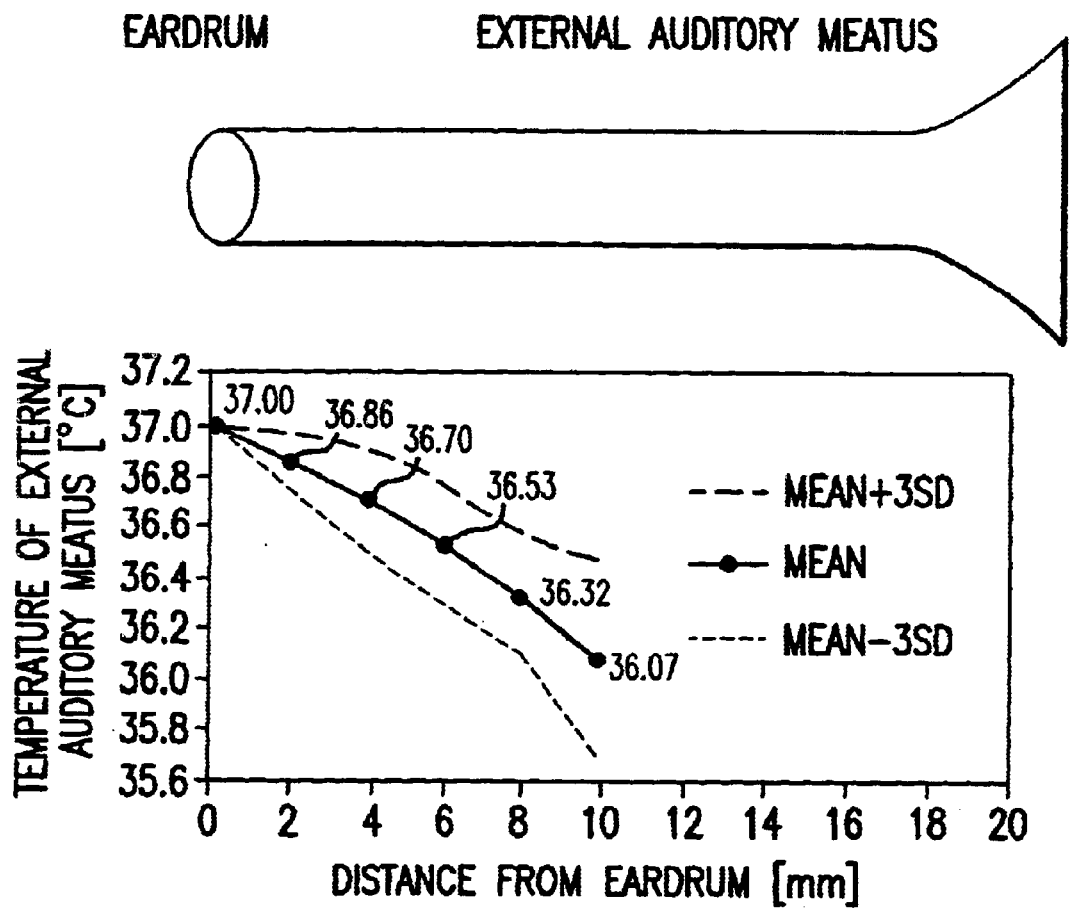
FIG. 13 is a view showing a temperature distribution with respect to an eardrum and an external auditory meatus.

Further, as shown in FIG. 11A, at the display of the measurement value of the body temperature, in the case where the measurement has been made at the position where the position of the probe 3 is optimum, an ear mark may be also displayed. As shown in FIG. 11B, level-bars indicating the position of the probe at the time of the measurement may be displayed with the measurement value of the body temperature. By doing so, since the user can clearly recognize the position of the probe 3 at the time of the measurement, the state of optimum positioning of the probe 3 can be learned. Accordingly, during the measurement, positioning of the probe 3 can be quickly made without moving the probe 3 variously. Thus, accurate measurement of body temperature becomes possible easily.

As described above, according to the present invention, since the insertion state of a probe is notified to the user, the user recognizes that the probe is correctly directed toward the eardrum, so that it is possible to provide a radiation clinical thermometer which does not require experience and can measure an accurate body temperature easily and quickly.

What is claimed is:

1. A radiation clinical thermometer comprising:

temperature measurement means for measuring a temperature of a measurement object on the basis of an amount of infrared light radiated from the measurement object;

a probe to be inserted in an ear of a user;

insertion state determination means for determining an insertion state of the probe by using a temperature measured with the temperature measurement means; and notification means for notifying the user of the insertion state of the probe on the basis of an insertion state determined with the insertion state determination means, wherein the temperature measurement means starts a body temperature measurement processing on the basis of the determined insertion state of the probe.

2. A radiation clinical thermometer comprising:

temperature measurement means for measuring a temperature of a measurement object on the basis of an amount of infrared light radiated from the measurement object;

a probe to be inserted in an ear of a user;

insertion state determination means for determining an insertion state of the probe by using a temperature measured with the temperature measurement means; and notification means for notifying the user of the insertion state of the probe on the basis of an insertion state determined with the insertion state determination means, wherein in a case the period of time for which the determination is performed is prolonged, a determination criterion of the insertion state of the probe is changed.

3. A radiation clinical thermometer comprising:

temperature measurement means for measuring a temperature of a measurement object on the basis of an amount of infrared light radiated from the measurement object;

a probe to be inserted in an ear of a user;

insertion state determination means for determining an insertion state of the probe by using a temperature measured with the temperature measurement means; and notification means for notifying the user of the insertion state of the probe on the basis of an insertion state determined with the insertion state determination means, wherein the notification means has a function to notify the insertion state of the probe stepwise.

4. A radiation clinical thermometer comprising:

temperature measurement means for measuring a temperature of a measurement object on the basis of an amount of infrared light radiated from the measurement object;

a probe to be inserted in an ear of a user;

insertion state determination means for determining an insertion state of the probe by using a temperature measured with the temperature measurement means;

notification means for notifying the user of the insertion state of the probe on the basis of an insertion state determined with the insertion state determination means; and display means for displaying a measurement result, wherein after completion of a body temperature measurement processing, the insertion state of the probe at the time of the measurement, together with a measurement value, is displayed on the display means.

5. A radiation clinical thermometer comprising:

temperature measurement means for measuring a temperature of a measurement object on the basis of an amount of infrared light radiated from the measurement object;

a probe to be inserted in an ear of a user;

insertion state determination means for determining an insertion state of the probe by using a temperature measured with the temperature measurement means; and notification means for notifying the user of the insertion state of the probe on the basis of an insertion state determined with the insertion state determination means, wherein the temperature measurement means has a function to correct a measurement value on the basis of the insertion state of the probe at the time of measurement.

6. A method of measuring a body temperature using a radiation clinical thermometer in which a probe is inserted in an ear and a temperature of a measurement object is measured on the basis of an amount of infrared light radiated from the measurement object, the method comprising:

a step of measuring the temperature of the measurement object toward which the inserted probe is directed;

a step of judging whether or not a measured temperature value is within a predetermined temperature range;

a step in which if the measured value is within the predetermined temperature range, it is determined that the probe has been inserted in the ear and this is notified to the user; and a step of starting a body temperature measurement processing on the basis of the determined insertion state of the probe.

7. A method of measuring a body temperature using a radiation clinical thermometer in which a probe is inserted in an ear and a temperature of a measurement object is measured on the basis of an amount of infrared light radiation from the measurement object, the method comprising: a step of measuring the temperature of the measurement object toward which the inserted probe is directed; a step of recognizing a variation pattern of temperature measurement values; a step of relating a predetermined variation pattern of the temperature measurement values to an insertion state of the probe; and a step of notifying a user of the related insertion state of the probe, wherein the insertion state of the probe suitable for body temperature measurement is related to a variation pattern in which two relative maximum values consecutively appear in the temperature measurement values from a predetermined point of time.

8. A method of measuring a body temperature using a radiation clinical thermometer in which a probe is inserted in an ear and a temperature of a measurement object is measured on the basis of an amount of infrared light radiated from the measurement object, the method comprising:

a step of measuring the temperature of the measurement object toward which the inserted probe is directed;

a step of recognizing a variation pattern of temperature measurement values;

a step of relating a predetermined variation pattern of the temperature measurement values to an insertion state of the probe; and a step of notifying a user of the related insertion state of the probe, wherein the related insertion state of the probe is notified stepwise according to a variation pattern of temperature measurement values.

9. A method of measuring a body temperature using a radiation clinical thermometer according to claim 8, wherein the variation pattern of the temperature measurement values related to the insertion state of the probe is a pattern in which a relative maximum value appears in the temperature measurement values.

* * * * *

UNITED STATES PATENT AND TRADEMARK OFFICE
CERTIFICATE OF CORRECTION

PATENT NO.    : 6,626,568 B2
DATED         : June 18, 2001
INVENTOR(S)   : Sato et al.

It is certified that error appears in the above-identified patent and that said Letters Patent is hereby corrected as shown below:

<u>Title page,</u>
Item [73], Assignee, should read -- Omron Corporation --.

Signed and Sealed this

Twenty-seventh Day of April, 2004

JON W. DUDAS
*Acting Director of the United States Patent and Trademark Office*